Patented June 21, 1932

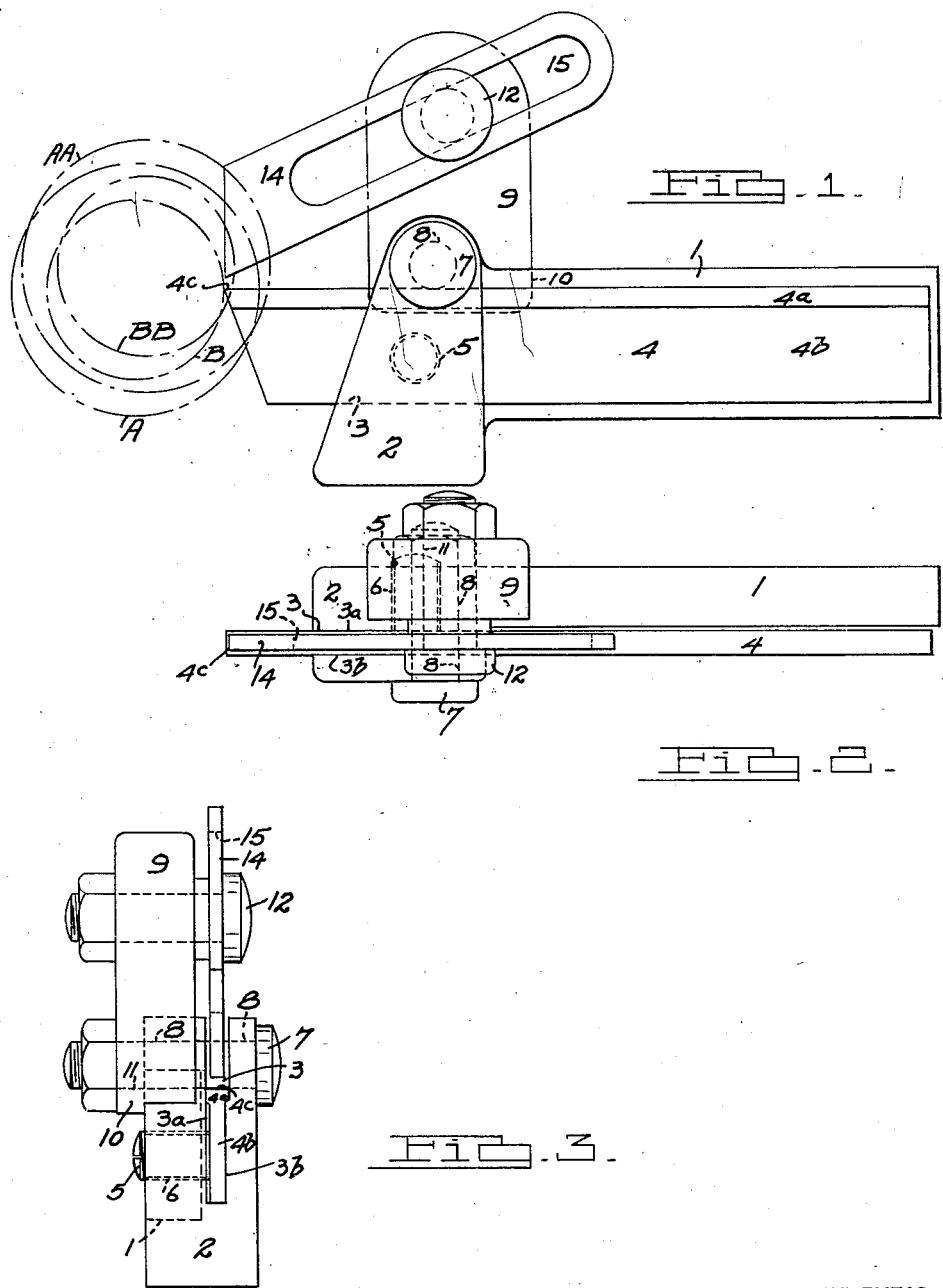

1,863,907

UNITED STATES PATENT OFFICE

JOHN M. LUERS, OF DETROIT, MICHIGAN

TOOL HOLDER AND BLADE PROTECTOR

Application filed November 3, 1930. Serial No. 492,968.

This invention relates to improvements in tool holders and blade protectors.

At the present time when a lathe or automatic machine is employed wherein the spindle is somewhat loose in its bearings, or wherein the headstock is loose on its bed, it is found that the work sometimes swings eccentrically downwards onto the top of the cutting end of the blade and causes a fracture of the latter.

It is an object of the present invention to provide a toolholder having a blade protector which extends outwardly over the blade and by which the eccentric swing of the work hereinbefore referred to may be checked before it gathers momentum and swings downwardly onto the blade. Moreover a blade protector made according to my invention is longitudinally adjustable so that the extent of its forward projection may be varied to suit the overhang of the blade it is to guard.

Other objects of the invention are to provide a toolholder for supporting cutter blades which is so constructed as to insure the blade being replaced in exactly the same position after it has been removed; which is relatively narrow in cross section; from which a blade can be set to project only a short distance; from which the blade can be removed without disturbing the setting of the holder; and on which the blade protector may be readily adjusted so as to project over the cutting edge of the blade and in alignment with the latter.

With these and other objects and advantages in view which will become apparent as the specification proceeds, the invention is hereinafter more fully described with the aid of the accompanying drawing, in which:

Figure 1 illustrates a side elevation of the invention showing the cutter blade projecting into a cut in a piece of work.

Figure 2 is a plan view of Figure 1, and

Figure 3 is a front elevation.

Referring to the drawing, 1 designates a toolholder shank having an integral head 2. The latter forms an extension at one extremity of the shank and also projects laterally in one direction beyond the latter. In the head 2 an open ended vertical slot 3 parallel with the shank 1 is formed which extends forwardly from the top of the said head and receives a blade 4 which may be moved longitudinally therethrough. The side of the shank 1 adjacent which the blade 4 rests is preferably set back out of alignment from the adjacent side 3a of the slot 3 to provide clearance for the blade 4, thereby facilitating longitudinal movement of the latter.

The blade 4 has a wider upper portion 4a on which the cutting edge 4c is formed and a narrower lower portion 4b. The side 3b of the slot 3 has a horizontally outwardly stepped upper portion to permit one side of the lower narrower portion 4b of the blade 4 to rest against the lower portion of that side of the slot. The blade 4 is normally held against movement in the toolholder by means of a screw 5 in engagement with a threaded aperture 6 formed transversely through one side of the head 2. This screw forces the lower portion 4b of the blade into frictional contact with the lower portion of the slot side 3b.

In order to prevent the blade from lifting in its slot a member, which in the present instance consists of a bolt 7, extends through opposed openings 8 formed in the head 2 and across the slot 3 immediately above the top of the blade 4. Thus it may be readily seen that the shank 1 affords ample hold for securing the toolholder, and the longitudinally slotted head 2 together with the screw 5 and bolt 7 afford satisfactory means for holding the blade 4 immovable therein.

The protector consists of a bracket 9 which rests on the top of the head 2 and projects upwardly therefrom. Integral with the bracket is a depending apron 10 which lies against one side of the head parallel with the slot 3. Through this apron an aperture 11 is formed through which the bolt 7 also extends. This bolt together with the curvature of the underside of the bracket 9 which conforms to the curvature of the top of the head 2 on which it rests holds the said bracket immovable.

Through the bracket 9 above the top of the head 2 a bolt 12 extends which also passes through a longitudinal slot 15 formed in a protector plate 14 intermediately of its length. This bolt 12 is employed to hold the plate 14 at any desired inclination and with its forward extremity at varying distances in front of the head 2. The plate 14 is flat in cross section and thinner than the blade 4 above which it is positioned.

The blade 14 is set with its front extremity substantially vertical, slightly behind the cutting edge 4c of the blade 4, and with its lower front extremity spaced a short distance above the said cutting edge.

In Figure 1 A indicates a piece of work in which a cut B has been made by the blade 4. The plate 14 also rests in the cut B, but as it is thinner than the blade it remains spaced from the sides of the said cut. If the work commences to rotate eccentrically as shown at AA the cut portion would normally descend upon the blade as shown at BB and break off the end of the blade. The provision of the protector plate 14 prevents such a condition arising, for as soon as the work commences to rotate eccentrically the base of the cut B strikes the plate 14 and the work is thrust back into its normal concentric position.

While in the foregoing the preferred embodiment of my toolholder and blade protector has been described and shown, it is understood that the construction is susceptible to such alterations and modifications as fall within the scope of the appended claims.

What I claim as my invention and desire to secure by Letters Patent is:

1. In combination, a toolholder, a blade held thereby and projecting therefrom, a protector plate, and means on said toolholder for supporting said protector plate so that it is in vertical alignment with said blade and its forward extremity lies above the cutting edge of the blade, said protector plate being of such width that its sides remain between and spaced from both sides of a cut made by said blade.

2. In combination, a toolholder, a blade held thereby and projecting therefrom, a longitudinally adjustable protector plate, means on said toolholder for supporting said protector plate in vertical alignment with said blade, and the forward extremity of said plate being disposed adjacent and above the cutting edge of said blade, said protector plate being of such width that its sides remain spaced from both sides of a cut made by said blade and between said sides.

3. In combination, a toolholder, a blade held thereby and projecting therefrom, a bracket on said toolholder, a protector plate having a longitudinal slot formed therethrough, fastening means extending from said bracket through said slot so that longitudinal adjustment of the plate on the bracket may be made, said protector plate being in vertical alignment with said blade, and said plate being thinner than said blade so as to remain spaced from both sides of a cut made by said blade.

4. A blade protector comprising a bracket adapted to be secured to a toolholder, and a protector plate carried by said bracket, said plate being adapted to gradually project further into a cut formed in work by a blade carried by the toolholder as the depth of said cut is increased by said blade, and to be positioned relative to the blade so that it protects the latter against damage from eccentric rotation of the work.

5. In combination, a toolholder, a blade held thereby and projecting therefrom, a bracket extending upwardly from said holder, a downwardly and forwardly inclined protector plate supported by said bracket so as to permit its longitudinal adjustment, said bracket being so positioned that said plate is in vertical alignment with said blade so that as the cut made by the latter in work increases in depth the plate enters said cut.

JOHN M. LUERS.